United States Patent
Ohlman et al.

(10) Patent No.: US 12,432,284 B2
(45) Date of Patent: Sep. 30, 2025

(54) SHARED CACHING IN A VIRTUALIZED NETWORK

(71) Applicant: Telefonaktiebolaget LM Ericsson (publ), Stockholm (SE)

(72) Inventors: Börje Ohlman, Bromma (SE); Anders E Eriksson, Kista (SE); Marcus Ihlar, Älvsjö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 68 days.

(21) Appl. No.: 18/570,998

(22) PCT Filed: Jul. 10, 2021

(86) PCT No.: PCT/IB2021/056212
§ 371 (c)(1),
(2) Date: Dec. 15, 2023

(87) PCT Pub. No.: WO2023/285852
PCT Pub. Date: Jan. 19, 2023

(65) Prior Publication Data
US 2024/0291906 A1  Aug. 29, 2024

(51) Int. Cl.
*H04L 67/568* (2022.01)
*H04L 41/40* (2022.01)
*H04L 67/63* (2022.01)

(52) U.S. Cl.
CPC ............ *H04L 67/568* (2022.05); *H04L 41/40* (2022.05); *H04L 67/63* (2022.05)

(58) Field of Classification Search
CPC .... H04L 67/568; H04L 41/40; H04L 67/1097
See application file for complete search history.

(56) References Cited

U.S. PATENT DOCUMENTS

| 2012/0072526 A1* | 3/2012 | Kling | ................. | G06F 12/0871 |
| | | | | 709/213 |
| 2012/0076052 A1* | 3/2012 | Kling | ..................... | H04L 45/64 |
| | | | | 370/255 |

(Continued)

OTHER PUBLICATIONS

Jun Wu et al. "Fog-Computing-Enabled Cognitive Network Function Virtualization for an Information-Centric Future Internet" IEEE communications magazine Jun. 2019 pp. 48-54 (Year: 2019).*

(Continued)

*Primary Examiner* — David R Lazaro
(74) *Attorney, Agent, or Firm* — Nicholson, De Vos, Webster & Elliott, LLP

(57) ABSTRACT

A method by a virtual network device in a virtualized network to support shared caching in the virtualized network. The method includes receiving a request message for content, determining whether the content is available in a shared virtual cache, wherein the shared virtual cache is shared by a plurality of virtual network devices in the virtualized network, obtaining the content from an upstream network device in response to a determination that the content is not available in the shared virtual cache, storing the content in the shared virtual cache to make the content available to the plurality of virtual network devices, and sending a response message containing the content towards an originator of the request message for the content.

20 Claims, 4 Drawing Sheets

(56) References Cited

U.S. PATENT DOCUMENTS

| | | | |
|---|---|---|---|
| 2016/0006836 A1* | 1/2016 | LeFaucheur | H04L 67/568 709/203 |
| 2016/0072667 A1* | 3/2016 | Zhu | H04L 67/2885 709/220 |
| 2016/0173636 A1* | 6/2016 | Wang | H04L 67/1001 709/213 |
| 2016/0234333 A1* | 8/2016 | Yeh | H04L 47/27 |
| 2016/0352604 A1 | 12/2016 | Valencia Lopez | |
| 2018/0146058 A1* | 5/2018 | Somayazulu | H04L 41/5009 |
| 2019/0286735 A1* | 9/2019 | Labian | H04L 67/1097 |
| 2020/0412829 A1* | 12/2020 | Huang | H04L 63/10 |
| 2021/0385153 A1* | 12/2021 | Godsey | H04L 69/22 |
| 2024/0291906 A1* | 8/2024 | Ohlman | H04L 67/63 |

OTHER PUBLICATIONS

Ahlgren, et al., "A Survey of Information-Centric Networking," IEEE Communications Magazine, Information-Centric Networking, Jul. 2012, pp. 26-36.

Alnumay, et al. "A network virtualization framework for information centric data center networks," 2015 12th Annual IEEE Consumer Communications and Networking Conference (CCNC), IEEE, Jan. 9, 2015, pp. 611-612, XP033176201.

Mosko, et al., "CCNx Messages in TLV Format", draft-irtf-icnrg-conxmessages-06, IETF Trust, ICNRG, Internet Draft, Oct. 29, 2017, pp. 1-79.

Mosko, et al., "CCNx Semantics", draft-irtf-icnrg-conxsemantics-06, IETF Trust, ICNRG, Internet Draft, Oct. 29, 2017, pp. 1-54.

Mosko, et al., "CCNx Messages in TLV Format," draft-irtf-icnrg-conxmessages-01, IETF Trust, ICNRG, Internet Draft, Jan. 11, 2016, pp. 1-27.

Mosko, et al., "CCNx Semantics," draft-irtf-icnrg-conxsemantics-01, IETF Trust, ICNRG, Internet Draft, Jan. 11, 2016, pp. 1-27.

Satria, et al., "Performance evaluation of ICN/CCN based service migration approach in virtualized LTE systems," 2014 IEEE 3rd International Conference on Cloud Networking (Cloudnet), IEEE, Oct. 8, 2014, pp. 461-467, XP032692347.

Wissingh, et al., "Information-Centric Networking (ICN): CCN and NDN Terminology", draft-irtf-icnrg-terminology-00, Dec. 24, 2017.

Wissingh, et al., "RFC 8793: Information-Centric Networking (ICN): Content-Centric Networking (CCNx) and Named Data Networking (NDN) Terminology," Informational Datatracker, Jun. 2020, pp. 1-14.

Wu, et al., "Fog-Computing-Enabled Cognitive Network Function Virtualization for an Information-Centric Future Internet", IEEE Communications Magazine, IEEE Service Center, vol. 57, No. 7, July, 1, 2019, pp. 48-54, XP011735672.

\* cited by examiner

SHARED CACHING IN A VIRTUALIZED NETWORK

CROSS-REFERENCE TO RELATED APPLICATIONS

This application is a national stage of International Application No. PCT/IB2021/056212, filed Jul. 10, 2021, which is hereby incorporated by reference.

TECHNICAL FIELD

Embodiments of the invention relate to the field of virtualized computer networks, and more specifically to caching in virtualized computer networks.

BACKGROUND

Information-centric networking (ICN) is an architecture to evolve the internet infrastructure from the existing host-centric design to a data-centric design, where accessing data by name becomes the essential network primitive. The goal of ICN is to let applications refer to data independently of their location or means of transportation, which helps enable native multicast delivery, ubiquitous in-network caching, and replication of data objects. The expected benefits of ICN are improved efficiency, better scalability with respect to information/bandwidth demand, and more robustness in the face of challenging communication scenarios (e.g., flash crowd events).

Content centric networking (CCN) is one approach within the ICN paradigm. Instead of focusing on connecting communicating endpoints (as traditional networking protocols such as Internet Protocol (IP) do), it focuses on the content object being retrieved. With CCN, messages are routed based on the globally unique names of content objects instead of the endpoint addresses referring to physical devices (as is the case with Transport Control Protocol (TCP) and IP).

In CCN, a content object is retrieved by issuing an interest message to the network containing the name of the content object. The interest message is routed by the network towards the publisher of the content object. Routers along the path that receive the interest message check if they have a cached copy of the content object. If so, they respond to the interest message with a content object message containing the requested content object and the interest message need not be propagated any further. The routing is helped by making the name of the content object a structured name (similar to a domain name but with richer syntax). Each router maintains a forwarding information base (FIB) that includes information regarding how to forward interest messages based on the name or name prefix contained in the interest messages. Also, each router keeps a record of the interest messages it has forwarded (e.g., where the interest messages came from and what content objects they named) in a pending interest table (PIT). If other interest messages naming the same content object name arrive at the router, it does not forward them but notes them and the interface over which they arrived in a PIT entry for the name of the content object. This technique is referred to as interest aggregation. The use of interest aggregation prevents unnecessary upstream propagation of interest messages. In this way, the PIT entries for the same content object name may form a tree in the network with receivers at the leaves.

When an interest message reaches an endpoint or router having a copy of the content object (perhaps cached), that endpoint or router responds to the interest message by generating a content object message that contains the content object as payload, which is propagated backwards along the path that the interest message traversed. The backward path is learned from the PIT entries for the content object name stored in the PITs of the routers along the path. If there were multiple interest messages arriving at a router naming the same content object (which would be recorded in the PIT), the content object message is replicated towards each direction from which those interest messages were received.

A content object is cached in the content store of an intermediate router so as to be able to serve future interest messages naming the content object directly from the intermediate router rather than having to forward the interest messages towards the publisher. The content store of a router can be considered as a form of a "local" cache or "dedicated" cache in the sense that it is typically implemented on the same physical device as the router (e.g., for easy/quick access) and is only used by that router (e.g., not accessible by other routers). After forwarding the content object message corresponding to a pending interest message, the router may delete the corresponding entry in the PIT (thus the entries in the PIT are expected to be short-lived). When the endpoints that originated the interest messages receive the content object message, the transaction is considered to be complete.

A benefit of CCN and other ICN approaches (e.g., named data networking (NDN)) is the ability to send the same information to multiple parties in the network. Since content objects are potentially cached in a content store of a router along the path that interest messages traverse, content objects need not be served from the original publisher and thus do not need to traverse the entire network every time a new requestor becomes interested in them—it is sufficient for an intermediate router to serve a copy of the content object. Another benefit of CCN and other ICN approaches is the aggregation of interest messages. In the case of a flash crowd event, where thousands of requestors suddenly request the same content object at the same time (or at around the same time), the publisher may only be reached by one interest message, while all other interest messages are served from the content stores of routers along the path towards the publisher.

When implementing local caches in an ICN network (e.g., content stores of routers in a CCN network), it is desirable for the local caches to be as large as possible to ensure a high cache hit rate. At the same time, the size of the local caches is limited by what is financially and technically reasonable.

SUMMARY

A method by a virtual network device in a virtualized network to support shared caching in the virtualized network. The method includes receiving a request message for content, determining whether the content is available in a shared virtual cache, wherein the shared virtual cache is shared by a plurality of virtual network devices in the virtualized network, obtaining the content from an upstream network device in response to a determination that the content is not available in the shared virtual cache, storing the content in the shared virtual cache to make the content available to the plurality of virtual network devices, and sending a response message containing the content towards an originator of the request message for the content.

A set of non-transitory machine-readable media having computer code stored therein, which when executed by a set of one or more processors of a physical network device implementing a virtual network device in a virtualized network, causes the virtual network device to perform operations for supporting shared caching in the virtualized network. The operations include receiving a request message for content, determining whether the content is available in a shared virtual cache, wherein the shared virtual cache is shared by a plurality of virtual network devices in the virtualized network, obtaining the content from an upstream network device in response to a determination that the content is not available in the shared virtual cache, storing the content in the shared virtual cache to make the content available to the plurality of virtual network devices, and sending a response message containing the content towards an originator of the request message for the content.

A physical network device configured to implement a virtual network device in a virtualized network that supports shared caching in the virtualized network. The physical network device includes one or more processors and a non-transitory machine-readable medium having computer code stored therein, which when executed by the one or more processors, causes the virtual network device to receive a request message for content, determine whether the content is available in a shared virtual cache, wherein the shared virtual cache is shared by a plurality of virtual network devices in the virtualized network, obtain the content from an upstream network device in response to a determination that the content is not available in the shared virtual cache, store the content in the shared virtual cache to make the content available to the plurality of virtual network devices, and send a response message containing the content towards an originator of the request message for the content.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
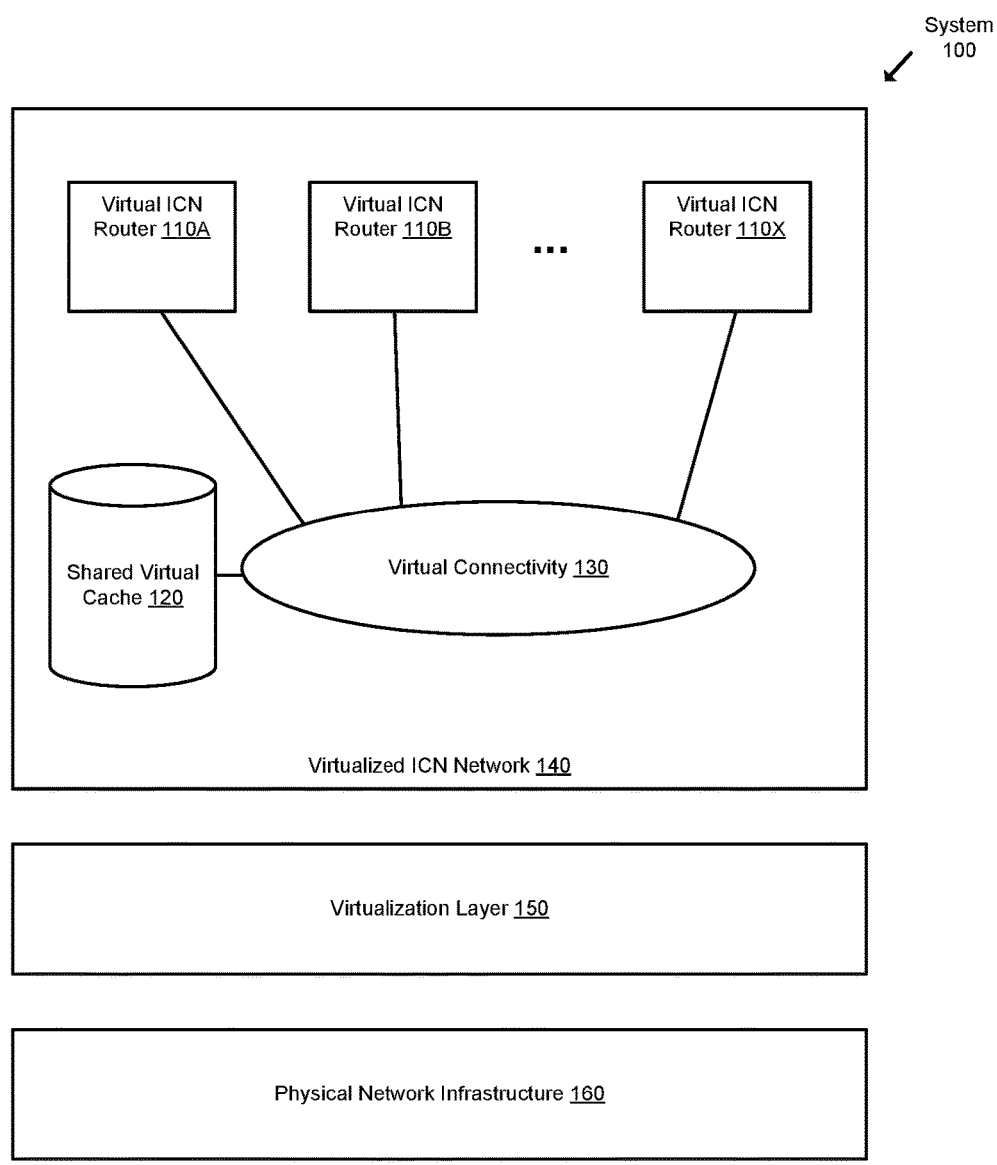
FIG. 1 is a block diagram of a system that implements a virtualized information-centric networking (ICN) network with a shared virtual cache, according to some embodiments.

The following description describes methods and apparatus for implementing shared caching in a virtualized network. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

As mentioned above, when implementing information-centric networking (ICN) networks (e.g., a content-centric networking (CCN) network), it is desirable for the local caches (e.g., content stores of routers in a CCN network) to be as large as possible to ensure a high cache hit rate. At the same time, the size of the local caches is limited by what is financially affordable/reasonable. One way to ensure a higher cache hit rate without significantly increasing financial cost is to pool the cache resources into one large cache that is shared by multiple ICN routers. However, this approach comes at the cost of increased network traffic and latency compared to using local caches since accessing the shared cache requires network communication over potentially multiple hops and long distances. This latency makes the use of a shared cache undesirable in traditional ICN networks.

When building networks, the current trend is to virtualize large portions of the network. For example, ICN networks may be virtualized on top of a physical network infrastructure. The virtualized ICN network may include virtual ICN routers that are connected using virtual connectivity. Existing virtualized ICN networks use the same caching model as traditional ICN networks in that they use a "dedicated" caching approach where each virtual ICN router has its own dedicated virtual cache for storing data objects. That is, existing virtualized ICN networks essentially take the naïve approach of adopting the same caching approach that is used in traditional (non-virtualized) ICN networks.

In contrast to the existing approach, embodiments disclosed herein implement a shared virtual cache that is shared by multiple virtual ICN routers in a virtualized ICN network. It has been observed that when an ICN network is virtualized, data objects stored in the dedicated virtual caches are distributed more or less randomly across the physical devices of the underlying physical network infrastructure. This observation holds, for example, when virtual caches are implemented using a distributed hash table (DHT) or a distributed memory-caching system (e.g., Memcached) in the underlying physical network infrastructure. Likewise, when an ICN network is virtualized, virtual ICN routers are implemented on the physical devices of the underlying physical network infrastructure. This means that a data object stored in a dedicated virtual cache of a virtual ICN router will have a more or less random physical location relative to that virtual ICN router (the statistics of the cache lookup latency for multiple different virtual ICN routers for multiple different data objects will reflect this location randomness), essentially negating the primary advantage of having dedicated caches (i.e., low latency). Using a shared virtual cache in a virtualized ICN network will have a higher cache hit rate compared to using dedicated virtual caches because the shared virtual cache can be larger and will include the union of the data objects that would be stored in the dedicated virtual caches. Thus, in a virtualized ICN network, using a shared virtual cache will incur similar overall latency compared to using dedicated virtual caches but provide a higher cache hit rate.

While the shared caching technique is primarily described herein in the context of a virtualized ICN network, the technique may be applied to other types of virtualized networks that implement caching to provide similar advantages.

An embodiment is a method by a virtual network device in a virtualized network to support shared caching in the virtualized network. The method includes receiving a request message for content, determining whether the content is available in a shared virtual cache, wherein the shared virtual cache is shared by a plurality of virtual network devices in the virtualized network, obtaining the content from an upstream network device in response to a determination that the content is not available in the shared virtual cache, storing the content in the shared virtual cache to make the content available to the plurality of virtual network devices, and sending a response message containing the content towards an originator of the request message for the content.

As used herein, an interest message is a message that is used to request a data object. An interest message may include the name of the data object being requested. The name of the data object may be structured/hierarchical (e.g., a sequence of name components) and may be semantically meaningful to make it expressive, flexible, and application-specific (e.g., similar to a domain name or uniform resource locator (URL)). In one embodiment, an interest message includes additional information besides the name of the data object such as additional restrictions (e.g., interest selectors), interest lifetime, hop limit, forwarding hints, and/or labels. The information included in an interest message may vary depending on the type of ICN being used. An interest message may also be referred to simply as an interest or as an information request.

As used herein, a data message is a message that is provided as a response to an interest message. A data message may contain the requested data object, the name of the data object, and the signature of the publisher. A data message may be secured through cryptographic signature mechanisms. In CCN, a data message may be referred to as a content object response.

As used herein, a pending interest table (PIT) is a table (or other type of data structure) that is used for recording received but not-yet-satisfied interest messages and the interfaces from which they were received. A PIT may also record the interfaces via which interest messages were sent out of, as well as information for assessing data-plane performance. Interest messages for the same data object may be aggregated in the same PIT entry.

As used herein, a forwarding information base (FIB) is a data structure that is used for storing information regarding how to forward interest messages towards a publisher. A FIB may store data object name prefixes and the interfaces that can be used to forward interest messages having names matching those prefixes. The list of interfaces for each prefix can be ranked, and each interface may be associated with additional information to facilitate forwarding-strategy decisions.

As used herein, an ICN publisher (or simply "publisher") is an ICN node that serves as the authoritative source of a data object. An ICN publisher may also be referred to as an ICN producer. A publisher may be implemented using one or more network devices.

As used herein, an ICN requestor (or simply "requestor") is an ICN node that requests a data object by generating and sending an interest message towards an ICN publisher. An ICN requestor may also be referred to as an ICN consumer. A requestor may be implemented using one or more network devices.

As used herein, an ICN router is an ICN node that sends interest messages towards publishers and sends data messages towards requestors. A virtual ICN router is a virtualized implementation of an ICN router (e.g., implemented using a virtual machine (VM), a container, or similar isolation mechanism).

Embodiments will now be described with reference to the accompanying figures.

FIG. 1 is a block diagram illustrating a system that implements a virtualized ICN network with a shared virtual cache, according to some embodiments.

As shown in the diagram, the system 100 includes a physical network infrastructure 160, a virtualization layer 150, and a virtualized ICN network 140. The physical network infrastructure 160 may include physical network components such as physical routers and physical links (e.g., wired and wireless links). The virtualized ICN network 140 may be an ICN network that is virtualized on top of the physical network infrastructure 160 using the virtualization layer 150. In one embodiment, the physical network infrastructure 160 and the virtualization layer 150 are provided by a cloud infrastructure service provider (e.g., Amazon® Web Services). The virtualized ICN network 140 may be a logical abstraction of a physical ICN network. As shown in the diagram, the virtualized ICN network 140 includes virtual ICN routers 110A-X and a shared virtual cache 120 that are connected using virtual connectivity 130. The shared virtual cache 120 is a virtual cache that is shared by multiple virtual ICN routers 110 in the virtualized ICN network 140 (e.g., shared by virtual ICN routers 110A-X).

A requestor (not shown) may request a data object by generating and sending an interest message containing the name of a data object towards the publisher of the data object. The interest message containing the name of a data object may be referred to herein as an interest message for the data object. The interest message for the data object may traverse the virtualized ICN network 140 on its path towards the publisher. When a virtual ICN router 110 along the path towards the publisher receives the interest message for the data object, it may determine whether the data object is available in the shared virtual cache 120. If the virtual ICN router 110 determines that the data object is not available in the shared virtual cache 120, it may record the interest message in its PIT and send the interest message towards the publisher of the data object (e.g., to an upstream virtual ICN router 110) according to forwarding information stored in its FIB. As used herein, the term "upstream" refers to a network path direction going towards a publisher. As used herein, the term "downstream" refers to a network path direction going towards a requestor.

The virtual ICN router 110 may subsequently receive a data message containing the requested data object from an upstream ICN node (e.g., as a result of another virtual ICN router 110 or the publisher itself responding to the interest message for the data object). The virtual ICN router 110 may store the data object contained in the data message in the shared virtual cache 120 (if not already stored) so that it can be made available to other virtual ICN routers 110 in the virtualized ICN network 140. The virtual ICN router 110 may then send the data message containing the requested data object towards the requestor (the originator of the interest message for the data object) according to information stored in its PIT (e.g., the virtual ICN router 110 may send the data message out of the interface over which the interest message was received).

Now, since the data object is stored in the shared virtual cache 120, if any of the virtual ICN routers 110 sharing the shared virtual cache 120 receives an interest message for the same data object, that virtual ICN router 110 may obtain the data object from the shared virtual cache 120 (without having to send the interest message for the data object towards the publisher of the data object) and send a data message containing the data object towards the requestor.

As mentioned above, existing virtualized ICN networks use a "dedicated" caching approach where each virtual ICN router has its own dedicated virtual cache for storing data objects. In contrast to the existing approach, embodiments disclosed herein use a shared virtual cache 120 that is shared by multiple virtual ICN routers 110. It has been observed that when an ICN network is virtualized, data objects stored in the dedicated virtual caches are distributed more or less randomly across the physical devices of the underlying physical network infrastructure. This observation holds, for example, when virtual caches are implemented using a distributed hash table (DHT) or a distributed memory-caching system (e.g., Memcached) in the underlying physical network infrastructure. Likewise, when an ICN network is virtualized, virtual ICN routers 110 are implemented on the physical devices of the underlying physical network infrastructure. This means that a data object stored in a dedicated virtual cache of a virtual ICN router will have a more or less random physical location relative to that virtual ICN router (the statistics of the cache lookup latency for multiple different virtual ICN routers for multiple different data objects will reflect this location randomness), essentially negating the primary advantage of having dedicated caches (i.e., low latency). Using a shared virtual cache 120 in a virtualized ICN network 140 will have a higher cache hit rate compared to using dedicated virtual caches because the shared virtual cache 120 can be larger and will include the union of the data objects that would be stored in the dedicated virtual caches. Thus, in a virtualized ICN network 140, using a shared virtual cache 120 will incur similar overall data object retrieval latency compared to using dedicated virtual caches but provide a higher cache hit rate.

The use of a shared virtual cache 120 in a virtualized ICN network 140 may improve the cache hit rate in one or more of the following ways:

(1) The shared virtual cache 120 only needs to store one copy of each data object for multiple virtual ICN routers 110. This efficient de-duplication means that more data objects can be stored in the shared virtual cache 120 than would have been stored in the sum of the dedicated virtual caches of the virtual ICN routers when using a dedicated caching approach.

(2) Data objects that might have been evicted from a smaller dedicated virtual cache will remain longer in a larger shared virtual cache 120.

(3) Data objects stored in the shared virtual cache 120 by one of the virtual ICN routers 110 is effectively a pre-population of the caches of all of the other virtual ICN routers 110 that share the shared virtual cache 120. This may provide significant performance advantages during critical network events such as flash crowd events (where multiple requestors request the same data object simultaneously or almost simultaneously).

Embodiments are based on the observation that in a virtualized ICN network 140, using a shared virtual cache 120 is more efficient compared to using dedicated virtual caches, as it provides a higher cache hit rate without sacrificing on latency.

While the shared caching technique is described herein primarily in the context of a virtualized ICN network 140, the technique can be applied to other types of virtualized networks that implement caching to provide similar advantages. In one embodiment, the shared caching technique can be applied to a virtualized content delivery network or virtualized content distribution network (CDN). For example, the virtualized CDN may include a group of virtual CDN servers that share the same virtual cache (e.g., to cache content for serving web pages such as Hypertext Markup Language (HTML) files, JavaScript files (.js files), Cascading Style Sheet (CSS) files (.css files), image files, etc.). The use of a shared virtual cache 120 will provide a higher cache hit rate in the CDN compared to having smaller dedicated virtual caches for each virtual CDN server while still having similar overall content-retrieval latency (e.g., due to the essentially random distribution of dedicated virtual caches across physical devices in the underlying physical network infrastructure).

Figure 2:
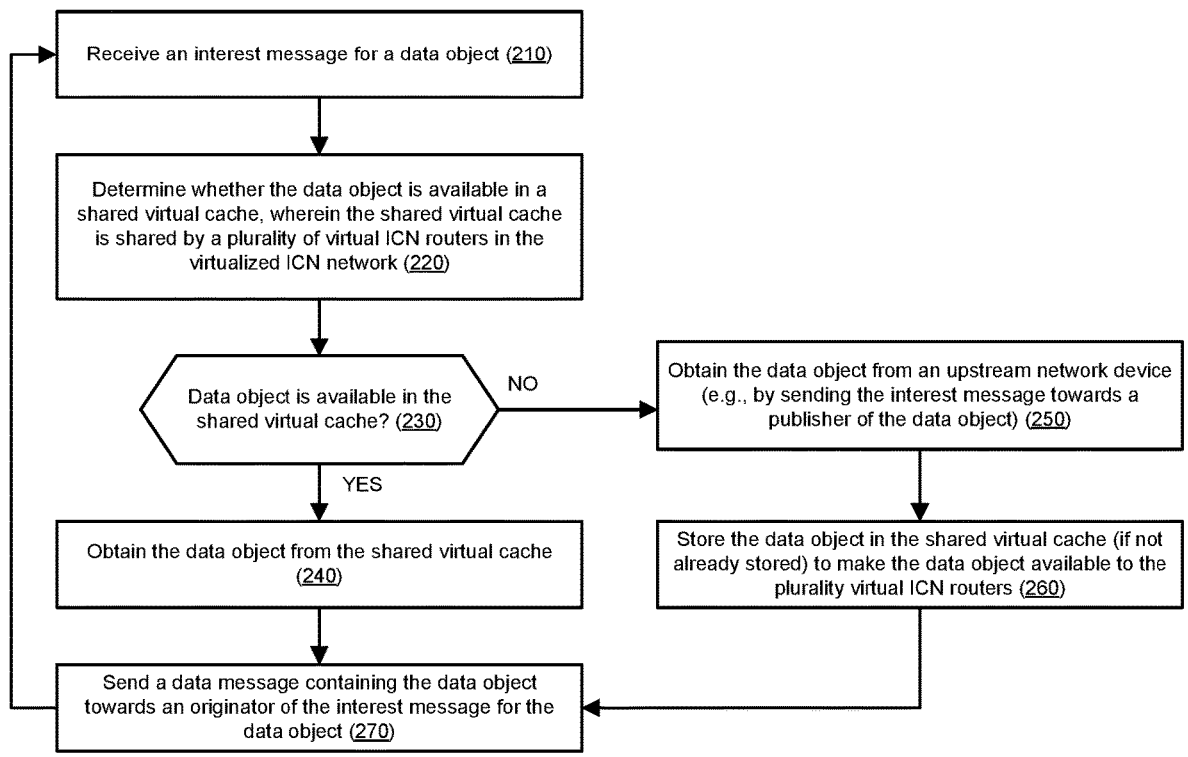
FIG. 2 is a flow diagram of a process for supporting shared caching in a virtualized ICN network, according to some embodiments.

FIG. 2 is a flow diagram illustrating a process for supporting shared caching in a virtualized ICN network, according to some embodiments. In one embodiment, the process is implemented by a virtual ICN router in a virtualized ICN network. The process may be implemented using hardware, software, firmware, or any combination thereof.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

At block 210, the virtual ICN router receives an interest message for a data object.

At block 220, the virtual ICN router determines whether the data object is available in a shared virtual cache, wherein the shared virtual cache is shared by a plurality of virtual ICN routers in the virtualized ICN network.

Referring to decision block 230, if the data object is not available in the shared virtual cache, at block 250, the virtual ICN router obtains the data object from an upstream network device (e.g., by sending the interest message towards a publisher of the data object). At block 260, the virtual ICN router stores the data object in the shared virtual cache (if not already stored) to make the data object available to the plurality of virtual ICN routers. Then, at block 270, the virtual ICN router sends a data message containing the data object towards an originator of the interest message for the data object (i.e., the original requestor).

Returning to decision block 230, if the data object is available in the shared virtual cache, at block 240, the virtual ICN router obtains the data object from the shared virtual cache and at block 270, sends a data message containing the data object towards an originator of the interest message for the data object (i.e., the original requestor).

The virtual ICN router may repeat the operations of blocks 210-270 for any further interest messages it receives.

Figure 3:
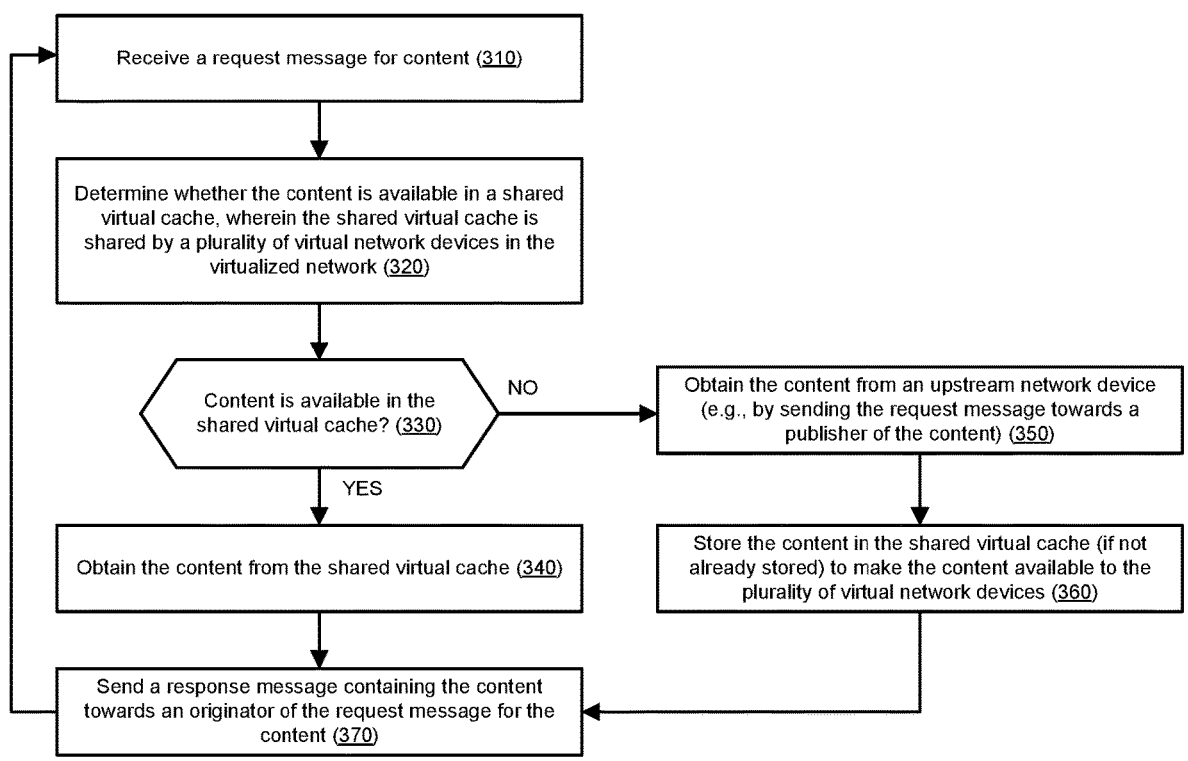
FIG. 3 is a flow diagram of a process for supporting shared caching in a virtualized network, according to some embodiments.

FIG. 3 is a flow diagram illustrating a process for supporting shared caching in a virtualized network, according to some embodiments. This process is a more generalized version of the process shown in FIG. 2. For example, the process shown in FIG. 3 may be applicable in a virtualized ICN network or a non-ICN virtualized network. In one embodiment, the process is implemented by a virtual network device in a virtualized network. The process may be implemented using hardware, software, firmware, or any combination thereof.

At block 310, the virtual network device receives a request message for content.

At block 320, the virtual network device determines whether the content is available in a shared virtual cache, wherein the shared virtual cache is shared by a plurality of virtual network devices in the virtualized network. In one embodiment, the virtual network device does not have a dedicated virtual cache that is dedicated to the virtual network device for storing content seen by the virtual network device (instead, the virtual network device uses the shared virtual cache for caching). In one embodiment, the shared virtual cache maintains a single copy of the content for the plurality of virtual network devices (there is no duplication of content).

Referring to decision block 330, if the content is not available in the shared virtual cache, at block 350, the virtual network device obtains the content from an upstream network device (e.g., by sending the request message towards a publisher of the content). At block 360, the virtual network device stores the content in the shared virtual cache (if not already stored) to make the content available to the plurality of virtual network devices. Then, at block 370, the virtual network device sends a response message containing the content towards an originator of the request message for the content (i.e., the original requestor).

Returning to decision block 330, if the content is available in the shared virtual cache, at block 340, the virtual network device obtains the content from the shared virtual cache and at block 370, sends a response message containing the content towards an originator of the request message for the content.

The virtual network device may repeat the operations of blocks 310-370 for any further request messages it receives.

In one embodiment, the virtual network device is a virtual ICN router in a virtualized ICN network, the request message for the content is an interest message for a data object, and the response message containing the content is a data message containing the data object. In such an embodiment, the content may be obtained from the upstream network device based on sending the interest message for the content towards a publisher of the data object.

In one embodiment, the virtual network device is a virtual CDN server in a virtualized CDN. In such an embodiment, the upstream network device may be an origin server hosting the content.

Figure 4A:
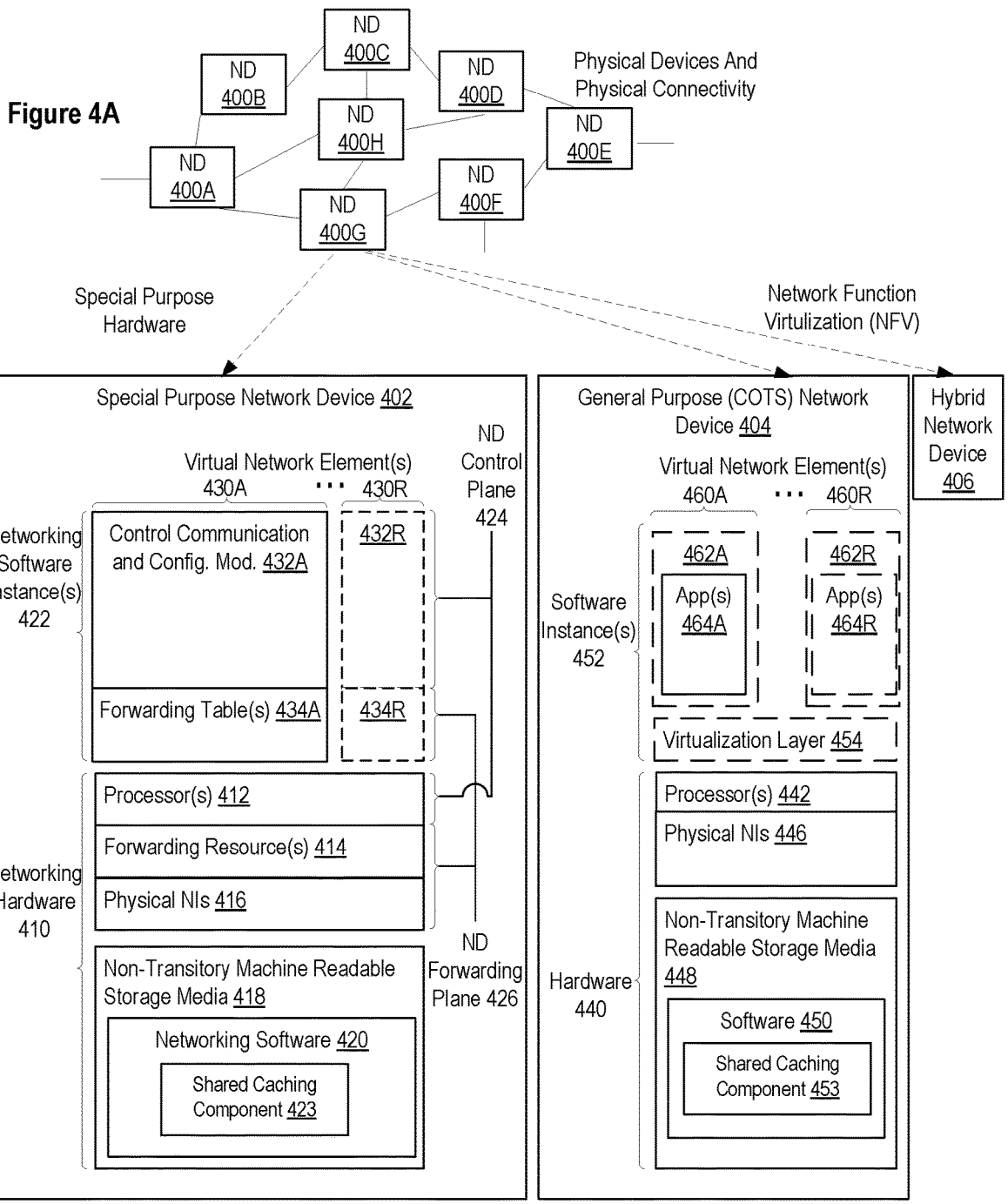
FIG. 4A illustrates connectivity between network devices (NDs) within an exemplary network, as well as three exemplary implementations of the NDs, according to some embodiments.

FIG. 4A illustrates connectivity between network devices (NDs) within an exemplary network, as well as three exemplary implementations of the NDs, according to some embodiments. FIG. 4A shows NDs 400A-H, and their connectivity by way of lines between 400A-400B, 400B-400C, 400C-400D, 400D-400E, 400E-400F, 400F-400G, and 400A-400G, as well as between 400H and each of 400A, 400C, 400D, and 400G. These NDs are physical devices, and the connectivity between these NDs can be wireless or wired (often referred to as a link). An additional line extending from NDs 400A, 400E, and 400F illustrates that these NDs act as ingress and egress points for the network (and thus, these NDs are sometimes referred to as edge NDs: while the other NDs may be called core NDs).

Two of the exemplary ND implementations in FIG. 4A are: 1) a special-purpose network device 402 that uses custom application-specific integrated-circuits (ASICs) and a special-purpose operating system (OS); and 2) a general purpose network device 404 that uses common off-the-shelf (COTS) processors and a standard OS.

The special-purpose network device 402 includes networking hardware 410 comprising a set of one or more processor(s) 412, forwarding resource(s) 414 (which typically include one or more ASICs and/or network processors), and physical network interfaces (NIs) 416 (through which network connections are made, such as those shown by the connectivity between NDs 400A-H), as well as non-transitory machine readable storage media 418 having stored therein networking software 420. During operation, the networking software 420 may be executed by the networking hardware 410 to instantiate a set of one or more networking software instance(s) 422. Each of the networking software instance(s) 422, and that part of the networking hardware 410 that executes that network software instance (be it hardware dedicated to that networking software instance and/or time slices of hardware temporally shared by that networking software instance with others of the networking software instance(s) 422), form a separate virtual network element 430A-R. Each of the virtual network element(s) (VNEs) 430A-R includes a control communication and configuration module 432A-R (sometimes referred to as a local control module or control communication module) and forwarding table(s) 434A-R, such that a given virtual network element (e.g., 430A) includes the control communication and configuration module (e.g., 432A), a set of one or more forwarding table(s) (e.g., 434A), and that portion of the networking hardware 410 that executes the virtual network element (e.g., 430A).

In one embodiment software 420 includes code such as shared caching component 423, which when executed by networking hardware 410, causes the special-purpose network device 402 to perform operations of one or more embodiments of the present invention as part of networking software instances 422 (e.g., to support shared caching in a virtualized network).

The special-purpose network device 402 is often physically and/or logically considered to include: 1) a ND control plane 424 (sometimes referred to as a control plane) comprising the processor(s) 412 that execute the control communication and configuration module(s) 432A-R; and 2) a ND forwarding plane 426 (sometimes referred to as a forwarding plane, a data plane, or a media plane) comprising the forwarding resource(s) 414 that utilize the forwarding table(s) 434A-R and the physical NIs 416. By way of example, where the ND is a router (or is implementing routing functionality), the ND control plane 424 (the processor(s) 412 executing the control communication and configuration module(s) 432A-R) is typically responsible for participating in controlling how data (e.g., packets) is to be routed (e.g., the next hop for the data and the outgoing physical NI for that data) and storing that routing information in the forwarding table(s) 434A-R, and the ND forwarding plane 426 is responsible for receiving that data on the physical NIs 416 and forwarding that data out the appropriate ones of the physical NIs 416 based on the forwarding table(s) 434A-R.

Figure 4B:
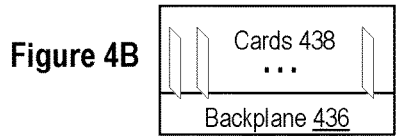
FIG. 4B illustrates an exemplary way to implement a special-purpose network device according to some embodiments.

FIG. 4B illustrates an exemplary way to implement the special-purpose network device 402 according to some embodiments. FIG. 4B shows a special-purpose network device including cards 438 (typically hot pluggable). While in some embodiments the cards 438 are of two types (one or more that operate as the ND forwarding plane 426 (sometimes called line cards), and one or more that operate to implement the ND control plane 424 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VOIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 436 (e.g., a first full mesh coupling the line cards and a second full mesh coupling all of the cards).

Returning to FIG. 4A, the general purpose network device 404 includes hardware 440 comprising a set of one or more processor(s) 442 (which are often COTS processors) and physical NIs 446, as well as non-transitory machine readable storage media 448 having stored therein software 450. During operation, the processor(s) 442 execute the software 450 to instantiate one or more sets of one or more applications 464A-R. While one embodiment does not implement virtualization, alternative embodiments may use different forms of virtualization. For example, in one such alternative embodiment the virtualization layer 454 represents the kernel of an operating system (or a shim executing on a base operating system) that allows for the creation of multiple instances 462A-R called software containers that may each be used to execute one (or more) of the sets of applications 464A-R: where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 454 represents a hypervisor (sometimes referred to as a virtual machine monitor (VMM)) or a hypervisor executing on top of a host operating system, and each of the sets of applications 464A-R is run on top of a guest operating system within an instance 462A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 440, directly on a hypervisor (in which case the unikernel is sometimes described as running within a LibOS virtual machine), or in a software container, embodiments can be implemented fully with unikernels running directly on a hypervisor represented by virtualization layer 454, unikernels running within software containers represented by instances 462A-R, or as a combination of unikernels and the above-described techniques (e.g., unikernels and virtual machines both run directly on a hypervisor, unikernels and sets of applications that are run in different software containers).

The instantiation of the one or more sets of one or more applications 464A-R, as well as virtualization if implemented, are collectively referred to as software instance(s) 452. Each set of applications 464A-R, corresponding virtualization construct (e.g., instance 462A-R) if implemented, and that part of the hardware 440 that executes them (be it hardware dedicated to that execution and/or time slices of hardware temporally shared), forms a separate virtual network element(s) 460A-R.

The virtual network element(s) 460A-R perform similar functionality to the virtual network element(s) 430A-R— e.g., similar to the control communication and configuration module(s) 432A and forwarding table(s) 434A (this virtualization of the hardware 440 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 462A-R corresponding to one VNE 460A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 462A-R to VNEs also apply to embodiments where such a finer level of granularity and/or unikernels are used.

In certain embodiments, the virtualization layer 454 includes a virtual switch that provides similar forwarding services as a physical Ethernet switch. Specifically, this virtual switch forwards traffic between instances 462A-R and the physical NI(s) 446, as well as optionally between the instances 462A-R; in addition, this virtual switch may enforce network isolation between the VNEs 460A-R that by policy are not permitted to communicate with each other (e.g., by honoring virtual local area networks (VLANs)).

In one embodiment, software 450 includes a shared caching component 453, which when executed by processor(s) 442, causes the general purpose network device 404 to perform operations of one or more embodiments of the present invention as part of software instances 462A-R (e.g., to support shared caching in a virtualized network).

The third exemplary ND implementation in FIG. 4A is a hybrid network device 406, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 402) could provide for para-virtualization to the networking hardware present in the hybrid network device 406.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 430A-R, VNEs 460A-R. and those in the hybrid network device 406) receives data on the physical NIs (e.g., 416, 446) and forwards that data out the appropriate ones of the physical NIs (e.g., 416, 446).

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments are not described with reference to any particular programming language. It will be appreciated that a variety of programming languages may be used to implement the teachings of embodiments as described herein.

An embodiment may be an article of manufacture in which a non-transitory machine-readable storage medium (such as microelectronic memory) has stored thereon instructions (e.g., computer code) which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

Throughout the description, embodiments have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

In the foregoing specification, embodiments have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method by a virtual network device in a virtualized network to support shared caching in the virtualized network, the method comprising:
    receiving a request message for content;
    determining whether the content is available in a shared virtual cache, wherein the shared virtual cache is shared by a plurality of virtual network devices in the virtualized network, wherein the plurality of virtual network devices and the shared virtual cache are virtualized on a same physical network infrastructure using a same virtualization layer;
    obtaining the content from an upstream network device in response to a determination that the content is not available in the shared virtual cache;
    storing the content in the shared virtual cache to make the content available to the plurality of virtual network devices; and
    sending a response message containing the content towards an originator of the request message for the content.

2. The method of claim 1, further comprising:
    receiving a further request message for the content;
    obtaining the content from the shared virtual cache in response to a determination that the content is available in the shared virtual cache; and
    sending a response message containing the content towards an originator of the further request message for the content.

3. The method of claim 1, wherein the virtual network device is a virtual information-centric networking (ICN) router, the request message for the content is an interest message for a data object, and the response message containing the content is a data message containing the data object.

4. The method of claim 3, wherein the content is obtained from the upstream network device based on sending the interest message for the content towards a publisher of the data object.

5. The method of claim 1, wherein the virtual network device is a virtual content delivery network (CDN) server.

6. The method of claim 5, wherein the upstream network device is an origin server hosting the content.

7. The method of claim 1, wherein the virtual network device does not have a dedicated virtual cache that is dedicated to the virtual network device for storing content seen by the virtual network device.

8. The method of claim 1, wherein the shared virtual cache maintains a single copy of the content for the plurality of virtual network devices.

9. A set of non-transitory machine-readable media having computer code stored therein, which when executed by a set of one or more processors of a physical network device implementing a virtual network device in a virtualized network, causes the virtual network device to perform operations for supporting shared caching in the virtualized network, the operations comprising:
    receiving a request message for content;
    determining whether the content is available in a shared virtual cache, wherein the shared virtual cache is shared by a plurality of virtual network devices in the virtualized network, wherein the plurality of virtual network devices and the shared virtual cache are virtualized on a same physical network infrastructure using a same virtualization layer;
    obtaining the content from an upstream network device in response to a determination that the content is not available in the shared virtual cache;
    storing the content in the shared virtual cache to make the content available to the plurality of virtual network devices; and
    sending a response message containing the content towards an originator of the request message for the content.

10. The set of non-transitory machine-readable media of claim 9, wherein the operations further comprise:
    receiving a further request message for the content;
    obtaining the content from the shared virtual cache in response to a determination that the content is available in the shared virtual cache; and
    sending a response message containing the content towards an originator of the further request message for the content.

11. The set of non-transitory machine-readable media of claim 9, wherein the virtual network device is a virtual information-centric networking (ICN) router, the request message for the content is an interest message for a data object, and the response message containing the content is a data message containing the data object.

12. The set of non-transitory machine-readable media of claim 11, wherein the content is obtained from the upstream network device based on sending the interest message for the content towards a publisher of the data object.

13. The set of non-transitory machine-readable media of claim 9, wherein the virtual network device is a virtual content delivery network (CDN) server.

14. The set of non-transitory machine-readable media of claim 13, wherein the upstream network device is an origin server hosting the content.

15. A physical network device configured to implement a virtual network device in a virtualized network that supports shared caching in the virtualized network, the physical network device comprising:
- one or more processors; and
- a non-transitory machine-readable medium having computer code stored therein, which when executed by the one or more processors, causes the virtual network device to:
  - receive a request message for content,
  - determine whether the content is available in a shared virtual cache, wherein the shared virtual cache is shared by a plurality of virtual network devices in the virtualized network, wherein the plurality of virtual network devices and the shared virtual cache are virtualized on a same physical network infrastructure using a same virtualization layer,
  - obtain the content from an upstream network device in response to a determination that the content is not available in the shared virtual cache,
  - store the content in the shared virtual cache to make the content available to the plurality of virtual network devices, and
  - send a response message containing the content towards an originator of the request message for the content.

16. The physical network device of claim 15, wherein the non-transitory machine-readable medium, when executed by the one or more processors, further causes the virtual network device to:
- receive a further request message for the content,
  - obtain the content from the shared virtual cache in response to a determination that the content is available in the shared virtual cache, and
  - send a response message containing the content towards an originator of the further request message for the content.

17. The physical network device of claim 15, wherein the virtual network device is a virtual information-centric networking (ICN) router, the request message for the content is an interest message for a data object, and the response message containing the content is a data message containing the data object.

18. The physical network device of claim 17, wherein the content is obtained from the upstream network device based on sending the interest message for the content towards a publisher of the data object.

19. The physical network device of claim 15, wherein the virtual network device is a virtual content delivery network (CDN) server.

20. The physical network device of claim 19, wherein the upstream network device is an origin server hosting the content.

* * * * *